(12) United States Patent
Inoue et al.

(10) Patent No.: US 7,927,743 B2
(45) Date of Patent: Apr. 19, 2011

(54) LITHIUM METAL COMPOSITE OXIDE PARTICLES, PROCESS OF PRODUCING LITHIUM METAL COMPOSITE OXIDE PARTICLES, ELECTRODE STRUCTURE CONTAINING LITHIUM METAL COMPOSITE OXIDE PARTICLES, PROCESS OF PRODUCING ELECTRODE STRUCTURE, AND LITHIUM SECONDARY BATTERY HAVING ELECTRODE STRUCTURE

(75) Inventors: Katsuhiko Inoue, Kyoto (JP); Soichiro Kawakami, Nara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/705,342

(22) Filed: Feb. 12, 2010

(65) Prior Publication Data

US 2010/0143801 A1    Jun. 10, 2010

Related U.S. Application Data

(62) Division of application No. 12/265,528, filed on Nov. 5, 2008, now Pat. No. 7,682,595, which is a division of application No. 10/788,284, filed on Mar. 1, 2004, now Pat. No. 7,510,805.

(30) Foreign Application Priority Data

Mar. 4, 2003    (JP) .................. 2003-056580

(51) Int. Cl.
H01M 4/58    (2010.01)
H01B 1/08    (2006.01)
H01M 4/04    (2006.01)

(52) U.S. Cl. .................................... 429/231.3

(58) Field of Classification Search ............... 429/231.3
See application file for complete search history.

(56) References Cited

U.S. PATENT DOCUMENTS

| 5,491,037 A | 2/1996 | Kawakami |
| 5,567,401 A | 10/1996 | Doddapaneni et al. |
| 5,641,591 A | 6/1997 | Kawakami et al. |
| 5,658,689 A | 8/1997 | Kawakami et al. |
| 5,667,596 A | 9/1997 | Tsuzuki et al. |

(Continued)

FOREIGN PATENT DOCUMENTS

JP    5-290849    11/1993

(Continued)

OTHER PUBLICATIONS

A. N. Dey, et al., "The Electrochemical Decomposition of Propylene Carbonate on Graphite", Journal of the Electrochemical Society, vol. 117, No. 2, 1970, pp. 222-224.

*Primary Examiner* — Gregg Cantelmo
(74) *Attorney, Agent, or Firm* — Fitzpatrick, Cella, Harper & Scinto

(57) ABSTRACT

There is provided a lithium secondary battery having a high capacity and excellent high-rate discharge characteristic and charge/discharge cycle characteristic. The lithium secondary battery comprises a negative electrode, a positive electrode and an ionic conductor, wherein the positive electrode comprises lithium metal composite oxide particles; the lithium metal composite oxide particles comprise a plurality of secondary particles in an elongated shape each comprised of a plurality of primary particles with an average particle size of 0.1 to 1 μm so aggregated as to form a void therebetween; and the secondary particle is columnar or planar and has an average size in a long length direction of 5 to 15 μm.

2 Claims, 7 Drawing Sheets

U.S. PATENT DOCUMENTS

| | | | |
|---|---|---|---|
| 5,679,176 | A | 10/1997 | Tsuzuki et al. |
| 5,698,339 | A | 12/1997 | Kawakami et al. |
| 5,702,845 | A | 12/1997 | Kawakami et al. |
| 5,728,482 | A | 3/1998 | Kawakami et al. |
| 5,800,939 | A | 9/1998 | Mishina et al. |
| 5,824,434 | A | 10/1998 | Kawakami et al. |
| 5,882,811 | A | 3/1999 | Kawakami |
| 5,888,666 | A | 3/1999 | Kawakami |
| 5,919,589 | A | 7/1999 | Kawakami et al. |
| 5,998,063 | A | 12/1999 | Kobayashi et al. |
| 6,037,095 | A | 3/2000 | Miyasaka |
| 6,051,340 | A | 4/2000 | Kawakami et al. |
| 6,063,142 | A | 5/2000 | Kawakami et al. |
| 6,165,642 | A | 12/2000 | Kawakami et al. |
| 6,255,020 | B1 | 7/2001 | Yamashita et al. |
| 6,329,096 | B2 | 12/2001 | Kawakami et al. |
| 6,372,387 | B1 | 4/2002 | Kawakami et al. |
| 6,377,030 | B1 | 4/2002 | Asao et al. |
| 6,432,585 | B1 | 8/2002 | Kawakami et al. |
| 6,475,664 | B1 | 11/2002 | Kawakami et al. |
| 6,517,974 | B1 | 2/2003 | Kobayashi et al. |
| 6,558,847 | B1 | 5/2003 | Kawakami et al. |
| 6,558,848 | B1 | 5/2003 | Kobayashi et al. |
| 6,569,568 | B2 | 5/2003 | Kobayashi et al. |
| 6,596,432 | B2 | 7/2003 | Kawakami et al. |
| 6,638,322 | B1 | 10/2003 | Kawakami et al. |
| 6,649,304 | B2 | 11/2003 | Tani et al. |
| 6,730,434 | B1 | 5/2004 | Kawakami et al. |
| 6,737,037 | B2 | 5/2004 | Ramasamy et al. |
| 6,835,332 | B2 | 12/2004 | Yamamoto et al. |
| 6,902,845 | B2 | 6/2005 | Tani et al. |
| 6,924,059 | B1 | 8/2005 | Kawakami et al. |
| 6,932,922 | B2 | 8/2005 | Gao et al. |
| 6,932,955 | B2 | 8/2005 | Yamamoto et al. |
| 6,949,312 | B1 | 9/2005 | Kawakami et al. |
| 7,141,187 | B2 | 11/2006 | Kosuzu et al. |
| 7,190,171 | B2 | 3/2007 | Kawakami et al. |
| 7,510,805 | B2 * | 3/2009 | Inoue et al. ............... 429/231.3 |
| 2004/0197659 | A1 | 10/2004 | Kumar et al. |

FOREIGN PATENT DOCUMENTS

| | | |
|---|---|---|
| JP | 7-037576 | 2/1995 |
| JP | 10-74516 | 3/1998 |
| JP | 2002-60225 | 2/2002 |

* cited by examiner

ILLUSTRATIVE VIEW OF PHOTOGRAPH IN FIG. 1A
(1) COLUMNAR, SECONDARY PARTICLE
(2) PLANAR, SECONDARY PARTICLE

ILLUSTRATIVE VIEW OF PHOTOGRAPH IN FIG. 2A
(1) COLUMNAR, SECONDARY PARTICLE
(2) PLANAR, SECONDARY PARTICLE

ILLUSTRATIVE VIEW OF PHOTOGRAPH IN FIG. 3A
(3) PRIMARY PARTICLE
(4) VOID

LITHIUM METAL COMPOSITE OXIDE PARTICLES, PROCESS OF PRODUCING LITHIUM METAL COMPOSITE OXIDE PARTICLES, ELECTRODE STRUCTURE CONTAINING LITHIUM METAL COMPOSITE OXIDE PARTICLES, PROCESS OF PRODUCING ELECTRODE STRUCTURE, AND LITHIUM SECONDARY BATTERY HAVING ELECTRODE STRUCTURE

This application is a divisional of application Ser. No. 12/265,528, filed Nov. 5, 2008, now U.S. Pat. No. 7,682,595, which is a divisional of application Ser. No. 10/788,284, filed Mar. 1, 2004, now U.S. Pat. No. 7,510,805. The contents of each of the foregoing applications are incorporated herein by reference.

BACKGROUND OF THE INVENTION

1. Field of the Invention

The present invention relates to lithium metal composite oxide particles, a process of producing the lithium metal composite oxide particles, an electrode structure containing the above-mentioned lithium metal composite oxide particles, and a process of producing the above-mentioned electrode structure, as well as to a lithium secondary battery which has the above-mentioned electrode structure. More specifically, the present invention relates to lithium metal composite oxide particles having excellent properties usable as an electrode material in a lithium secondary battery, a process of producing the lithium metal composite oxide particles, an electrode structure containing the above-mentioned lithium metal composite oxide particles, and a process of producing the above-mentioned electrode structure, as well as to a lithium secondary battery which has a positive electrode constituted of an electrode structure composed of the above-mentioned lithium metal composite oxide particles. The lithium secondary battery has a high capacity and excellent high-rate discharge characteristic and charge/discharge cycle characteristic.

2. Related Background Art

The amount of $CO_2$ gas contained in the atmosphere has been recently increasing, and global warming due to the greenhouse effect, is worried about. In the meantime, thermal power plants that convert a thermal energy obtained by combustion of fossil fuel into an electric energy discharge a large quantity of $CO_2$ gas. It is becoming difficult to newly build a thermal power plant under these circumstances. Taking such a situation into consideration and for the purpose of coping with a growing demand for electricity, the so-called load leveling approach has been proposed as a method of utilizing electric power effectively, in which approach an electric power is stored during night in secondary batteries installed at individual houses and is used in the daytime for much power consumption thereby equalizing the load. Besides this, motorcars running by fossil fuel and discharging $CO_2$ gas, $NO_x$, $SO_x$ and the like are regarded as problematic as another source of air pollutants. From a viewpoint of reducing the sources of air pollutants, electric vehicles that run by powering a motor with electricity stored in a secondary battery and discharge no air pollutants draw attention, and research and development are intensively conducted so as to early put them in practical use. The secondary battery used for such electric vehicles is required to have high energy density, a long life and low cost.

Apart from this, as a secondary battery for use in the power supply of a portable apparatus such as a notebook personal computer, a word processor, a video camera, and a cellular phone, early provision of compact, lightweight and higher-performance secondary batteries are eagerly desired.

As such a compact, lightweight, and high-performance secondary battery, an example of applying a lithium-graphite intercalation compound to a negative electrode of a secondary battery was reported in JOURNAL OF THE ELECTROCHEMICAL SOCIETY 117,222 (1970) and since then, a rocking chair type secondary battery, the so-called "lithium ion battery" which, for example, uses carbon (including graphite) for a negative electrode active material and lithium cobalt oxide particles for a positive electrode active material and inserts and occludes lithium between carbon layers via a charging reaction have been developed and partly put into practical use.

In the meantime, as a positive electrode active material for the lithium secondary battery including such a "lithium ion battery", lithium cobalt oxide $LiCoO_2$ has been mainly used. Further, as a positive electrode active material other than the above-mentioned lithium cobalt oxide, use of lithium nickel oxide, lithium manganese oxide, or the like is being studied. Moreover, those compounds having a part of the metallic elements of these oxides substituted with other metallic elements have also been proposed and partly used. When a positive electrode active material is to be selected, selection is performed in consideration of advantages and disadvantages in terms of cost and performance and depending on the purpose. In relation to the potential performance which an positive electrode active material originally has, the constitutional elements and crystal structure of the active material are important but in the lithium secondary battery which uses the so-called composite electrode formed by mixing with a conductive auxiliary material and a binder, the shape of active material particle to be used is also an important factor. For example, the smaller the particle size is, the larger the specific surface area tends to be, and an active material particle with a larger specific surface area has a larger surface area in contact with a nonaqueous electrolytic solution thereby providing an advantage to allow a uniform electrochemical reaction in charging/discharging. However, if the particle size of the active material is too small, unless the amount of a binder used is increased, the binding strength will become weak, whereby the active material will become easy to peel off from the electrode. On the other hand, if the amount of the binder is increased, the active material particles will be excessively covered by the binder thereby reducing the conductivity, so that there arises a necessity to increase the amount of the conductive auxiliary material used. Further, if the amount of the conductive auxiliary material used is thus increased, the binding strength will become weak to effect easy peeling off of the active material, so that the electrode formation will become difficult. On the contrary, if the size of the active material particle is simply too large, the specific surface area thereof will become smaller, and as a result, there will be posed the problem that a nonaqueous electrolytic solution may reach the inside of the active material particle in a prolonged time and consequently uniform electrochemical reaction during charging/discharging may be hindered, whereby the original performance of the active material cannot efficiently be exhibited.

Under these circumstances, a positive electrode active material for use in a lithium secondary battery is desired to have a moderately large particle size suitable for electrode formation as well as a larger specific surface area in order to make advantageous for charging/discharging. Further, there is an eager need for providing a lithium metal oxide particle that has such a shape as to meet such a need and a process of producing the same.

Japanese Patent Application Laid-Open No. 5-290849 discloses a process of producing lithium metal oxide particles having a large average particle size usable for a positive electrode active material in a nonaqueous electrolyte secondary battery, by charging lithium carbonate and cobalt oxide powders into a granulator, adding a binder thereto, granulating the mixture and calcining the obtained granules. Japanese Patent Application Laid-Open No. 10-74516 discloses a process of producing lithium cobalt composite oxide ($LiCoO_2$) particles usable for a positive electrode active material for a lithium secondary battery by dissolving lithium nitrate and cobalt nitrate in a mixed solution of water and alcohol, spraying the resulting mixed solution as a mist from a nozzle into a thermal decomposition furnace adjusted to a predetermined temperature at a predetermined rate, thermally decomposing the mixture to obtain a composite oxide powder and annealing the composite oxide powder at a predetermined temperature. The Laid-Open gazette discloses that the particle of the above-mentioned lithium cobalt composite oxide has a hollow spherical shape formed of secondary particles which are in tern formed of aggregated primary particles and that the secondary particles have an average particle size of 1 to 5 μm and a specific surface area of 2 to 10 $m^2/g$.

However, the active material particles prepared by the above-mentioned processes have the problem that the specific surface area is not sufficiently large, and the contact resistance between the active material particles is large and consequently the capacity significantly reduces when a high current is passed. On the other hand, the demand for a further improvement of the performance of a lithium secondary battery mentioned above, i.e., the demand for early provision of a lithium secondary battery having further improved performance of the positive electrode and charging/discharging characteristic has been becoming strong. Under these circumstances, in particular in relating to the lithium metal oxide used as a positive electrode active material of a lithium secondary battery, early provision of a lithium metal oxide that has more excellent performance including the shape of the particle is desired strongly.

SUMMARY OF THE INVENTION

It is, therefore, an object of the present invention to provide lithium metal composite oxide particles which are free from the problems mentioned above and can satisfy the above-mentioned demands and requirements, i.e., lithium metal composite oxide particles which have excellent characteristics to be suitably used as an electrode material for constituting a positive electrode of a lithium secondary battery utilizing intercalating and deintercalating reactions of lithium ions for charging/discharging reactions (hereinafter, simply referred to as "lithium secondary battery"), and a process of producing the same.

It is another object of the present invention to provide an electrode structure containing the above-mentioned lithium metal composite oxide particles and a process of producing the same.

It is still another object of the present invention to provide a lithium secondary battery which has a positive electrode comprised of an electrode structure comprised of the above-mentioned lithium metal composite oxide particles and has a high capacity and excellent high-rate discharge characteristic and charge/discharge cycle characteristic.

The present inventors have searched through experiments for an electrode material that is to constitute a positive electrode of a lithium secondary battery and superior to the conventional lithium metal composite oxide particles and have found that when the particular lithium metal composite oxide particles described below are used as a main component material of the electrode material to constitute a positive electrode, it is possible to provide the above-mentioned lithium secondary battery with a high capacity and excellent high-rate discharge characteristic and charge/discharge cycle characteristic.

That is, the lithium metal composite oxide particles are lithium metal composite oxide particles which electrochemically intercalate and deintercalate lithium ions and comprise a plurality of secondary particles in an elongated shape each comprised of a plurality of primary particles with an average particle size of 0.1 to 1 μm so aggregated as to form a void therebetween, wherein the secondary particle has a columnar or planar shape and an average size in a long length direction of 5 to 15 μm.

The present invention has been accomplished based on the above-mentioned findings.

The term "lithium secondary battery" as used herein is intended to mean not only a lithium secondary battery utilizing intercalating and deintercalating reactions of lithium ions for charging/discharging reactions but also a "secondary lithium-ion battery" which uses a carbon material for a negative electrode material.

The present invention encompasses a process of producing the above-mentioned lithium metal composite oxide particles, i.e., lithium metal composite oxide particles which electrochemically intercalate and deintercalate lithium ions and comprises a plurality of secondary particles in an elongated shape each comprised of a plurality of primary particles with an average particle size of 0.1 to 1 μm so aggregated as to form a void therebetween, wherein the secondary particle has a columnar or planar shape and an average size in a long length direction of 5 to 15 μm. The process comprises the steps of:

(1) mixing a cobalt-salt containing aqueous solution, a surfactant and unsubstituted or substituted urea to prepare a mixed solution;

(2) heating the mixed solution or adding an alkali component to the mixed solution to raise the pH value of the mixed solution, thereby depositing a cobalt-containing compound;

(3) mixing a lithium-containing material with the deposited cobalt-containing compound or a cobalt-containing oxide obtained by heat-treating the deposited cobalt-containing compound to prepare a mixture; and (4) calcining the mixture in air or oxygen.

Moreover, the present invention encompasses an electrode structure which uses the lithium metal composite oxide particles having the specific particle shapes produced by the above-mentioned production process, a process of producing the electrode structure based on the process of producing the above-mentioned lithium metal composite oxide particles and a lithium secondary battery having a positive electrode comprised of the above-mentioned electrode structure.

The present invention uses the lithium metal composite oxide particles having the specific particle shapes mentioned above as a main component material of an electrode material which constitute a positive electrode, i.e., an active material in a lithium secondary battery, thereby realizing a lithium secondary battery having a high capacity and excellent high-rate discharge characteristic and charge/discharge cycle characteristic.

The term "active material" as used herein is intended to mean a substance that participates in release and insertion of lithium in an electrochemical reaction (repetition of this reaction) of charging/discharging in an electrode of a lithium secondary battery, i.e., a substance that can reversibly release and insert lithium ions in the above-mentioned electrochemistry reaction. According to the present invention, since the lithium metal composite oxide particles having the specific particle shapes mentioned above have a large surface area, when they are used as the active material, the surface area in contact with the electrolytic solution will be large and accordingly, diffusion of the lithium ions into the above-mentioned active material more readily proceeds and the release/insertion of the lithium ions on charging/discharging occurs uniformly and evenly, and fracture of crystals due to uneven release or insertion of lithium ions which may occur at repeated charging/discharging will be reduced. It is believed that these features result in the excellent effects in the charging/discharging characteristic at a high current density and in the charge/discharge cycle characteristic.

In the meantime, a process for the production of an electrode structure generally comprises a pressing step for the purpose of increasing the packing density of active material particles in a battery container and enhancing the conductivity between the active material particles, wherein the electrode structure formed by coating of the above-mentioned active material particles along with a conductive auxiliary material and a binder is pressed. However, since the lithium metal composite oxide particles of the present invention as active material particles have a substantially uniform particle size, and since they have elongated columnar or planar secondary particle shapes, they have a remarkable advantage that the directions of the particles tend to align uniformly in the coating step of a active material particle paste or in the pressing step in the production process of an electrode structure. Especially in the pressing step, the secondary particles of an elongated shape are pressed against each other strongly and the contact areas become large, so that the contact resistance can be made small. Moreover, the active material particles, although they have a comparatively large specific surface area, comprise large secondary particles formed of primary particles sintered, so that the electrode can be formed without increasing the amount of the binder used. Therefore, the conductivity between the active material particles after pressing is good, which is considered to effectively contribute to the high capacity charge/discharge characteristic.

Moreover, in the present invention, by producing the lithium metal composite oxide particles having the specific particle shapes mentioned above by the above-mentioned production process and forming the electrode structure used for a positive electrode of a lithium secondary battery using the lithium metal composite oxide particles, it is possible to produce a electrode structure with a low resistance and to provide a lithium secondary battery having a high capacity, an excellent charging/discharging efficiency and a long-life high-rate discharge characteristic as well as an excellent charge/discharge cycle characteristic by applying the electrode structure to a lithium secondary battery, This is because the unique shape of the cobalt-containing compound formed in the process steps (1) to (2) of the above-mentioned production process becomes a basic shape and this basic shape is partly maintained in the process steps (3) to (4) of the above-mentioned production process, so that the lithium metal composite oxide particles having the above-mentioned specific particle shape can easily be produced.

As stated above, the present inventors have found that in a lithium secondary battery (lithium secondary battery utilizing intercalating and deintercalating reactions of lithium ions for charging/discharging) having at least a negative electrode, a positive electrode, an electrolyte and a battery case, the use of the electrode structure formed with the specific lithium metal composite oxide particles described below as the positive electrode enables the lithium secondary battery to have a high capacity and an excellent high-rate discharge characteristic as well as an excellent charge/discharge cycle characteristic. That is, the lithium metal composite oxide particles are lithium metal composite oxide particles which electrochemically intercalate and deintercalate lithium ions and comprises a plurality of secondary particles in an elongated shape each comprised of a plurality of primary particles with an average particle size of 0.1 to 1 μm so aggregated as to form a void therebetween, wherein the secondary particle has a columnar or planar shape and an average size in a long length direction of 5 to 15 μm.

The lithium metal composite oxide particles, the electrode structure, and the lithium secondary battery of the present invention will be described below more specifically with reference to the appended photographs and figures.

DETAILED DESCRIPTION OF THE PREFERRED EMBODIMENTS (Lithium Metal Composite Oxide Particle)

Figure 1A:
FIG. 1A is a scanning electron microscope photograph (magnification: 2000) showing an example of the lithium metal composite oxide particles in accordance with the present invention.
Figure 1B:
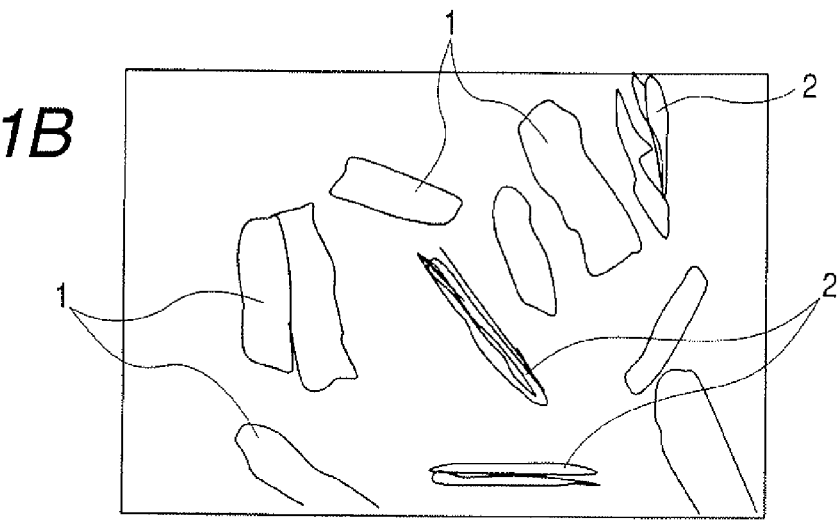
FIG. 1B is a conceptual view schematically illustrating the shapes of the lithium metal composite oxide particles recognizable from the photograph of FIG. 1A.
Figure 1C:
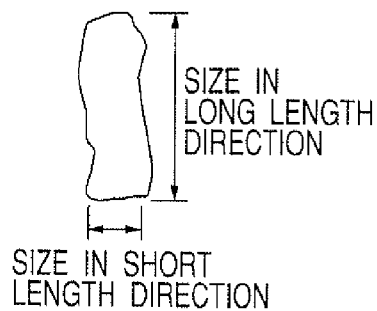
FIG. 1C is a conceptual view showing the particle size of a columnar secondary particle of the lithium metal composite oxide particles recognized from the photograph of FIG. 1A.
Figure 1D:
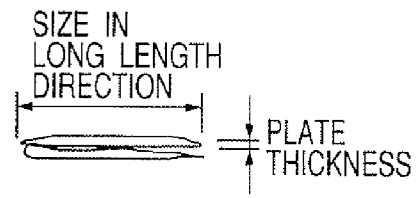
FIG. 1D is a conceptual view showing the particle size of a planar secondary particle of the lithium metal composite oxide particles recognized from the photograph of FIG. 1A.
Figure 2A:
FIG. 2A is a scanning electron microscope photograph (magnification: 10000) showing an example of the lithium metal composite oxide particles in accordance with the present invention
Figure 2B:
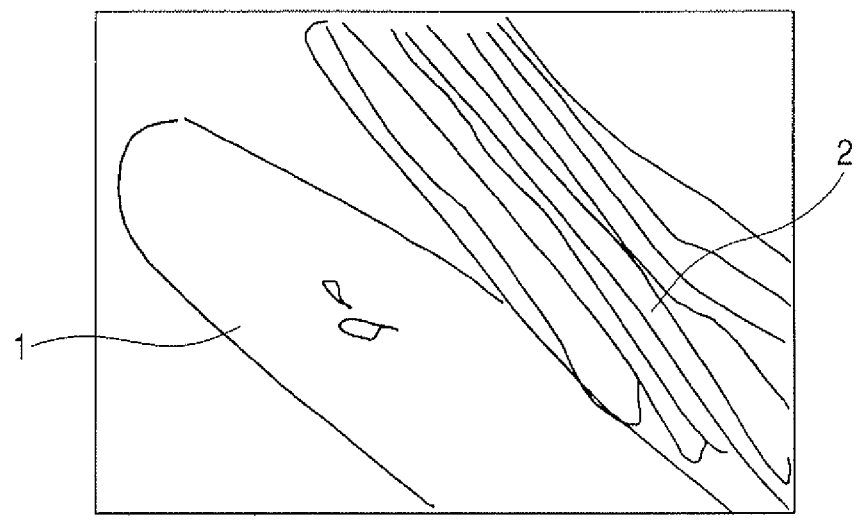
FIG. 2B is a conceptual view schematically illustrating the shapes of the lithium metal composite oxide particles recognizable from the photograph of FIG. 2A.
Figure 3A:
FIG. 3A is a scanning electron microscope photograph (magnification: 30000) showing an example of the lithium metal composite oxide particles in accordance with the present invention
Figure 3B:
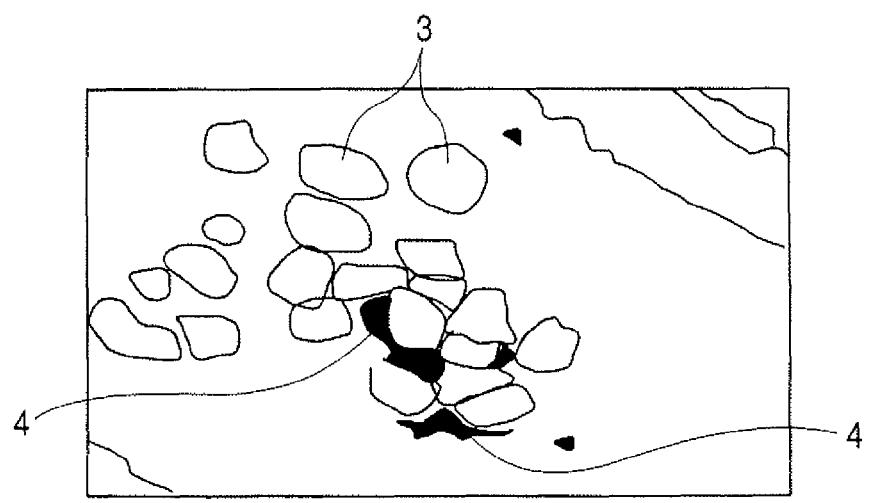
FIG. 3B is a conceptual view schematically illustrating the shapes of the lithium metal composite oxide particles recognizable from the photograph of FIG. 3A.

The photographs shown in FIG. 1A, FIG. 2A and FIG. 3A are photographs of a typical example of the lithium metal composite oxide particles of the present invention observed by a scanning electron microscope, and these photographs are taken on the same sample by different magnifications of 2000, 10000 and 30000, respectively. FIG. 1B, FIG. 2B and FIG. 3B are illustrative views schematically showing the feature of the particle shape which can be recognized from the photographs of FIG. 1A, FIG. 2A and FIG. 3A, respectively. These photographs and figures show that the lithium metal composite oxide particles of the present invention have specific particle shapes. The secondary particle of this lithium metal composite oxide particle is either in a columnar shape (or rod-shape) 1 or in a planar shape 2 or may be a mixture thereof. In any case, the photographs of FIG. 1A, FIG. 2A, and FIG. 3A show that the particles have elongated shapes. As to the particle size, the concept is shown in the schematic views of FIGS. 1C and 1D. FIGS. 2A and 3A also show that the secondary particles of the lithium metal composite oxide particles of the present invention are formed through sintering of a plurality of fine primary particles. The primary particles are discriminable since the contour (profile) thereof can be recognized when observed with a scanning electron microscope.

The average particle size of the primary particles that is one of the characteristic features of the present invention is preferably not more than 1 mm in order to increase the specific surface area and to enlarge the surface area in contact with the electrolytic solution. However, if the average particle size is less than 0.1 mm when observed with a scanning electron microscope, it is assumed that the performance cannot be exhibited since the crystal growth is insufficient and the conductivity is low. Another characteristic feature is that adjacent primary particles 3 are not in a close contact with each other but there exist voids 4 in places (FIG. 3B). This is supposed to be the reason why a large specific surface area is achieved. The specific surface area can be measured by the B.E.T. (Brunauer-Emmett-Teller) method.

Still further characteristic feature of the lithium metal composite oxide particles of the present invention is that the particle size of the secondary particles is uniform. That is, the secondary particles have elongated shapes, and the shapes are columnar or planar with an average size in the long length direction of 5 to 15 μm. The particle size can be observed and measured by means of a scanning electron microscope. These secondary particles are supposed to be effective for achieving desirable electrode performance since when they are used to prepare an electrode structure according to an ordinary manufacturing process of the electrode structure in which a paste thereof obtained by kneading with a conductive auxiliary material, a binder and a solvent is applied on a metal foil such as aluminum foil, there is no need to increase the amount of the binder so as to maintain adhesion with the electrode structure material such as metal foil substrate and conductive auxiliary material.

The crystal structure from which the performance of the lithium metal composite oxide particles of the present invention derives can be measured and investigated by powder X-ray diffractometer.

When the lithium metal composite oxide particles of the present invention having the specific particle shapes as described above are used as active material particles of a positive electrode of a lithium secondary battery, since the active material particles have large specific surface areas due to the above-mentioned particle shapes and therefore the particle surface area in contact with the electrolytic solution will be large and accordingly, diffusion of the lithium ions into the active material particles more readily proceeds and the release/insertion of the lithium ions on charging/discharging occurs uniformly and evenly, thereby reducing fracture of crystals due to uneven release/insertion of lithium ions which may occur during repeated charging/discharging. It is believed that these features result in the excellence in the charging/discharging characteristic at a high current density and in the charge/discharge cycle characteristic.

Moreover, an ordinary process of manufacturing an electrode structure generally comprises a pressing step for the purpose of increasing the packing density of active material particles in a battery container and enhancing the conductivity between the active material particles, wherein the electrode structure formed by coating of the active material particles together with a conductive auxiliary material and a binder is pressed. The lithium metal composite oxide particles of the present invention as active material particles have a substantially uniform particle size, and since they have elongated secondary particle shapes, they have a remarkable advantage that the directions of the particles tend to align uniformly in the coating step of an active material particle paste or in the pressing step of the production process of an electrode structure. Moreover, the lithium metal composite oxide particles of the present invention, although they have a comparatively large specific surface area, comprise large secondary particles formed of sintered primary particles, so that a desired electrode structure can be formed without increasing the amount of a binder used. Therefore, the conductivity between the active material particles after pressing is good and this is considered to effectively contribute to the high capacity charging/discharging characteristics.

(Production Process of Lithium Metal Composite Oxide Particles)

As stated previously, the production of the lithium metal composite oxide particles of the present invention is typically effected by conducting at least the following steps (1) to (4) in sequence:

(1) mixing a cobalt-salt containing aqueous solution, a surfactant and unsubstituted or substituted urea to prepare a mixed solution;

(2) heating the mixed solution or adding an alkali component to the mixed solution to raise the pH value of the mixed solution, thereby depositing a cobalt-containing compound;

(3) mixing a lithium-containing material with the deposited cobalt-containing compound or a cobalt-containing oxide obtained by heat-treating the deposited cobalt-containing compound to prepare a mixture; and (4) calcining the mixture in air or oxygen.

The cobalt salt used in the step (1) is preferably a salt having a high solubility to water such as cobalt nitrate, cobalt acetate, cobalt formate, cobalt chloride, cobalt sulfate, or the like. In the step (1), unsubstituted or substituted urea is mixed in a solution of such a salt and the mixture is agitated until it becomes sufficiently uniform. The amount of water in this step is preferably an amount sufficient to dissolve the cobalt salt and the urea or substituted urea such as ethylurea or thiourea, and 10 to 50 times the total weight of the cobalt salt is more preferable. A surfactant is then added to this solution, and the mixture is agitated until it becomes uniform. The amount of the surfactant to be added is preferably 1 to 50% of the total weight of the added water. The agitation is conducted until the surfactant is homogenized well in the solution in this step. Although warming the mixture helps homogenization and is desirable, warming to an excessively high temperature causes the unsubstituted or substituted urea begin to decompose, and accordingly, it is preferable to limit the temperature to less than 70° C. in this stage of the step (1).

Here, the reason for using unsubstituted or substituted urea is to obtain a homogeneous deposit of a cobalt-containing compound in the subsequent step (2), and for this reason the mixture is preferably agitated until the solution becomes uniform enough in the step (1).

In the step (2), the pH value of the solution which has been made uniform enough in the step (1) is raised by the decomposition of the unsubstituted or substituted urea in the solution, so that a deposit of a desired cobalt-containing compound can be obtained. Decomposition of the unsubstituted or substituted urea may be conducted by gradually adding an alkali component such as sodium hydroxide, lithium hydroxide, potassium hydroxide, etc. However, a more preferable method of decomposing the unsubstituted or substituted urea is heating, and it is preferable to heat to a temperature within the range of 70° C. to 130° C. It is more preferable to heat to a temperature of 90° C. to 110° C. This is because it is necessary to decompose the unsubstituted or substituted urea dissolved uniformly in the step (1) such that the pH value is gradually raised without generating any gradient of the pH value over the entirety of the reaction system.

Figure 4:
FIG. 4 is a scanning electron microscope photograph (magnification: 10000) showing an example of the cobalt-containing compound generated in the process steps of producing the lithium metal composite oxide particles of the present invention.

The reason for using a surfactant in the step (1) is to obtain a precipitation of the cobalt-containing compound that has specific shapes as shown in the photograph of FIG. 4. The surfactant has properties to orient in an aqueous solution, and coordinate to cobalt ions dissolved in the aqueous solution. It is supposed that when a cobalt-containing compound is deposited as the pH value is raised, the compound orientates while being influenced by the form that the associated surfactant molecules take, and therefore that the surfactant has an effect of facilitating the reaction to proceed uniformly and giving regularity to the structure of the product. The rise in the pH value is caused by ammonia generated by the decomposition of the unsubstituted or substituted urea in the solution, and since this process will raise the pH values of the whole solution all at once, any gradient of the pH value may hardly occur over the entirety of the reaction system, and the deposition reaction can uniformly proceed. It is supposed that uniform particles can be generated for this reason.

The cobalt-containing compound that deposits in the step (2) and has the specific shapes as shown in the photograph of FIG. 4 may be considered as an intermediate of the lithium metal composite oxide particles of the present invention. The deposited cobalt-containing compound may be directly mixed with a lithium-containing material in the step (3) to prepare a mixture, or the deposited cobalt-containing compound may be heat-treated to be converted to a cobalt-containing oxide, and this cobalt-containing oxide may then be mixed with the lithium-containing material to prepare a mixture. The mixture is baked in the step (4). Thus, the shapes of the intermediate are partly maintained and partly changed, and finally provides the lithium metal composite oxide particles with the specific particle shapes. That is, the elongated intermediate particles having thin pieces superposed upon each other as shown in the photograph of FIG. 4 are subjected to the step (3) and are then partly sintered and partly dropped off in the calcining of the step (4), whereby lithium metal composite oxide particles comprising elongated secondary particles comprised of a plurality of fine primary particles and voids and having columnar or planar shapes on the whole are formed. When a secondary particle is columnar, it is supposed to be a case where secondary planar particles have been further sintered with each other. On the other hand, when a secondary particle is planar, it is supposed to be a case where the degree of sintering of the thin pieces of the above-mentioned intermediate is small, and the average thickness of the secondary planar particle will be 0.1 to 1 μm.

The above-mentioned cobalt-containing oxide can be obtained by heat-treating the deposited cobalt-containing compound in oxygen or air held at a temperature of 250° C. to 1200° C., and the specific shapes hardly changes. Therefore, the step (3) may be conducted by directly mixing the deposited cobalt-containing compound with a lithium-containing material, or by firstly heat-treating the deposited cobalt-containing compound to convert it to a cobalt-containing oxide followed by mixing with a lithium-containing material, and either way after the calcining of the step (4) will finally attain the purpose of obtaining the lithium metal composite oxide particles having the specific particle shapes as mentioned above.

Since the unsubstituted or substituted urea or the surfactant and the like may be decomposed depending on the calcining temperature in the step (4), they may be co-present along with the lithium-containing material and the cobalt-containing compound (the cobalt-containing compound deposited in the step (2)). However, more preferably, the cobalt-containing compound is subjected to washing in water, hot water, or alcohol between the steps (2) and (3) to remove unreacted, unsubstituted or substituted urea, surfactant and cobalt salt anion groups, etc.

Although the calcining temperature in the step (4) is preferably a temperature within the range of 700° C. to 1000° C. in air or oxygen in forming lithium metal composite oxide particles, it may carried out by pre-calcining, for example, at a temperature within the range of 200° C. to 700° C. in air or oxygen followed by calcining at a temperature within the range of 700° C. to 1000° C.

The lithium-containing material used in the step (4) is preferably a material which is easy to decompose by heating and easy to react uniformly with the cobalt-containing compound and includes, for example, lithium nitrate, lithium hydroxide, lithium acetate, lithium formate, lithium citrate, lithium carbonate, lithium alkoxide and the like. The mixing is conducted taking into consideration the purpose of maintaining the specific shapes of the above-mentioned cobalt-containing compound without receiving an excessively strong stress that may destroy the above-mentioned shapes and is therefore preferably carried out by mixing with the cobalt-containing compound using water or alcohol as a solvent or dispersion medium. When a solvent or dispersion medium is used, it may preferably be evaporated prior to the start of the step (4).

In a case where the cobalt in the lithium metal composite oxide particles of the present invention is partly substituted with other metallic elements, a salt containing a metallic element for substitution may be added to the cobalt-salt containing solution in the step (1). Moreover, irrespective of whether the material containing the metallic element for substitution is easy to or hard to dissolve in water, the material which contains the metallic element for substitution may also be mixed when mixing the above-mentioned cobalt-containing compound and lithium-containing material in the step (3).

Here, for the purpose of maintaining the specific shapes of the above-mentioned cobalt-containing compound, the material that contains the metallic elements for substitution is preferably mixed with the cobalt-containing compound using water or alcohol as a solvent or dispersion medium. When a solvent or dispersion medium is used in this way, it may be evaporated and the calcining may then be effected in the step (4) thereby producing metal-substituted, lithium metal composite oxide particles.

It is preferable that the mixing ratio of the lithium-containing material in the step (3) satisfies the condition of $0<$(number of lithium atoms)/(total number of metal atoms other than lithium)$\leqq 1.2$, and more preferably, the condition of $1.0<$(number of lithium atoms)/(total number of metal atoms other than lithium)$\leqq 1.1$ taking into consideration the number of lithium atoms, the number of cobalt atoms of the cobalt-containing compound and the number of atoms of a metallic element in the material containing the metallic element for substitution.

(Electrode Structure)

Figure 5A:
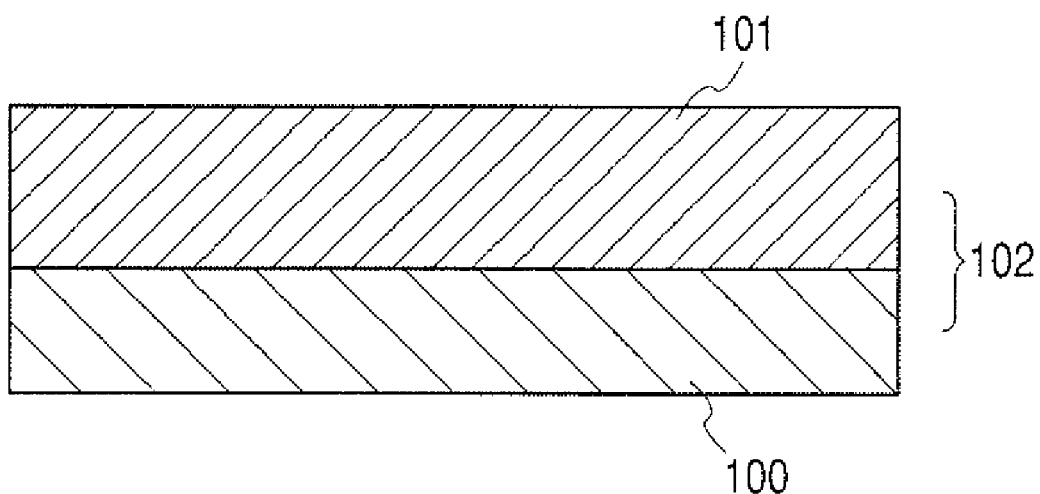
FIG. 5A is a schematic side view showing the constitution of the electrode structure using the lithium metal composite oxide particles of the present invention and FIG. 5B is a schematic sectional view showing the cross-sectional constitution of the electrode structure of FIG. 5A.
Figure 5B:
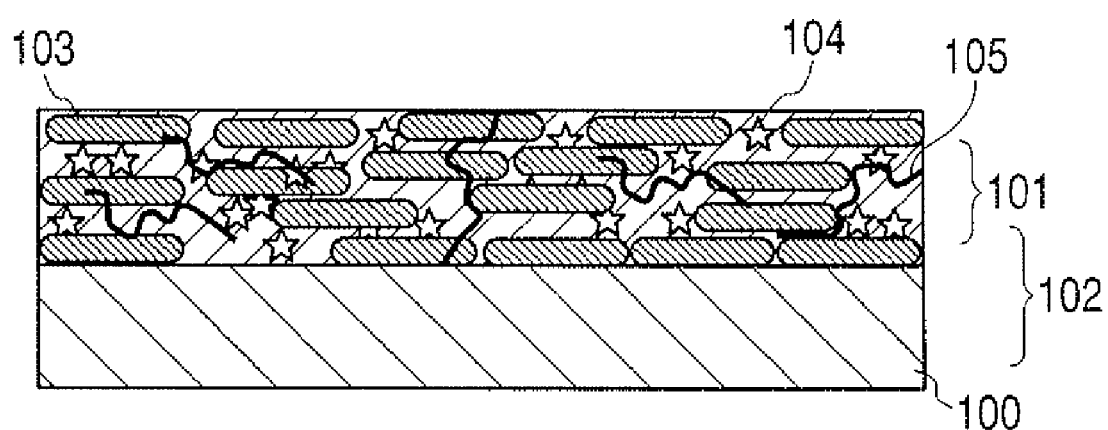

FIG. 5 is a conceptual view schematically showing an embodiment of an electrode structure (102) in accordance with the present invention, and the electrode structure is produced using the lithium metal composite oxide particles of the present invention. Specifically, FIG. 5A is a side view schematically showing the constitution of the electrode structure 102, and FIG. 5B is a sectional view schematically showing the internal structure of the electrode structure 102. The electrode structure 102 consists of an electrode material layer 101 (active material layer) shaped on a current collector 100 and made of lithium metal composite oxide particles 103 (lithium metal composite oxide particles having the shapes such as shown in FIGS. 1A, 2A and 3A mentioned above) having a conductive auxiliary material 104 and a binder 105 added thereto.

An example of the production method of the electrode structure 102 will be described below.
(1) The lithium metal composite oxide particles (103), a binder (105) and a conductive auxiliary material (104) are mixed, and added with a solvent to adjust the viscosity, thereby preparing a paste.
(2) The paste is applied on the collector 100 and dried to form the electrode structure 102. The thickness may be adjusted using a roll press or the like as needed.

The method of applying the above-mentioned paste on the collector 100 includes, for example, the coater coating and the screen printing.

Examples of the conductive auxiliary material 104 used for the electrode structure 102 include amorphous carbon (carbon black) such as acetylene black, graphite, and a metal inactive to battery reactions. The conductive auxiliary material may preferably be in the form of powders or fibers.

Examples of the binder 105 used for the electrode structure 102 include polyolefins such as polyethylene and polypropylene, or fluororesins such as polyvinylidene fluoride and tetrafluoroethylene polymer.

The collector 100 plays a role of efficiently supplying a current consumed at an electrode reaction at the time of charging or collecting a current generated at the time of discharging. Therefore, a material used to form the collector 100 of the electrode structure 102 is preferably a compound that has a high conductivity and is inactive to battery reactions. Preferable examples of such a material include nickel, stainless steel, titanium, aluminum, copper, platinum, palladium, gold, various alloys and composite metal consisting of two or more of these metals. As the shape of the collector 100, shapes such as a plate, foil, mesh, sponge, fiber, punching metal and expanded metal can be used, for example.

(Lithium Secondary Battery)

Figure 6:
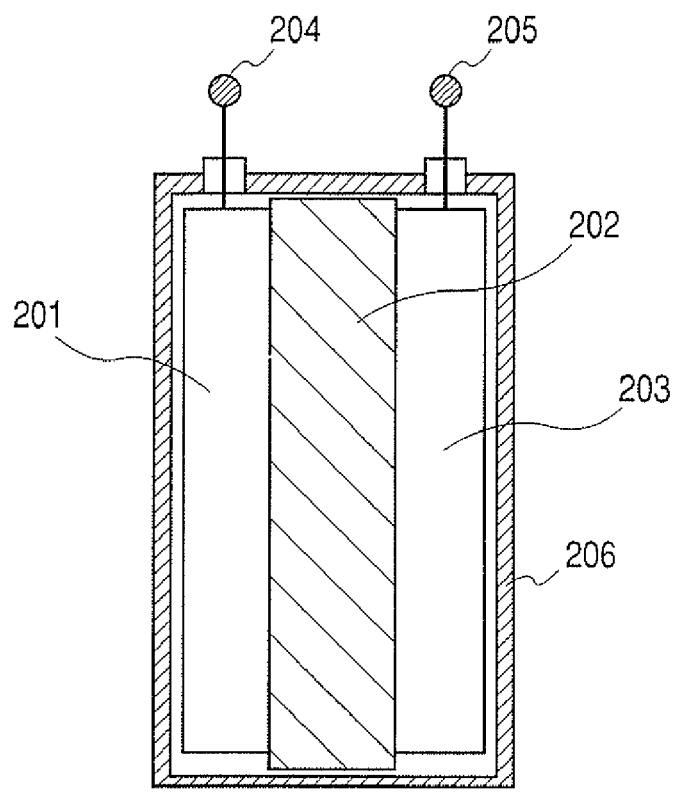
FIG. 6 is a schematic view showing the constitution of a typical example of the lithium secondary battery in accordance with the present invention.

FIG. 6 is a conceptual view schematically showing an embodiment of the lithium secondary battery of the present invention. In the secondary battery shown in FIG. 6, a positive electrode 203 and a negative electrode 201 are housed in a battery case (housing) 206 so as to face each other with an ionic conductor 202 (separator holding an electrolyte (electrolytic solution)) therebetween, and the positive electrode 203 and negative electrode 201 are connected to the positive electrode terminal 205 and the negative electrode terminal 204, respectively.

In the above-mentioned lithium secondary battery, the electrode structure of the present invention such as denoted by reference numeral 102 in FIGS. 5A and 5B using the lithium metal composite oxide particles 103 having the shapes such as shown, for example, in the photograph of FIGS. 1A, 2A and 3A is used as a positive electrode 203 utilizing the electrochemical potential of the intercalation and deintercalation of lithium ions.

Each of the constituent elements of the lithium secondary battery of the present invention will be described below.

(Negative Electrode 201)

When the electrode structure using the lithium metal composite oxide particles of the present invention is used only for a positive electrode 203 of the lithium secondary battery, in the negative electrode 201 as a counter electrode, as the negative electrode active material that plays a role of a host material for lithium ions for the lithium secondary battery, carbon materials including graphite, lithium metal, a lithium alloy, a material containing a metallic element which can form an alloy with lithium and a porous metal can be used. In addition, oxides, sulfides and nitrides of the transition metal that can generate an electromotive force in combination with the positive electrode active material can be used. When the negative electrode active material is in the form of powders, it may be used with a binder or sintered in order to form a negative electrode layer on a collector for making the negative electrode. When the negative electrode active material powder has a low conductivity, it is preferable to mix a conductive auxiliary material as with the formation of the active material layer of the above-mentioned electrode structure. As the collector and the conductive auxiliary material, those described above for the production of the electrode structure 102 can be suitably used.

(Positive Electrode 203)

In the present invention, the electrode structure 102 using the lithium metal composite oxide particles 103 of the present invention stated above is basically used as a positive electrode 203. In this case, the electrode material layer 101 (active material layer) is formed on the collector 100 using a binder to make a positive electrode 203. When the active material 103 of FIG. 5 has a low conductivity, it is preferable to mix a conductive auxiliary material 104 as with the formation of the electrode material layer 101 of the above-mentioned electrode structure. As the collector and the conductive auxiliary material, those used in the electrode structure 102 described above can be suitably used.

(Ionic Conductor)

Generally, the ionic conductor 202 may be a separator holding an electrolyte (electrolytic solution). The separator plays a role to prevent a short circuit between the negative electrode 201 and the positive electrode 203 within the battery. The separator needs to have fine pores allowing lithium ions to move therethrough and to be insoluble and stable in an electrolytic solution. Therefore, as a separator, there are preferably used, for example, materials of nonwoven fabrics or micropore structure using glass, polyolefins such as polypropylene and polyethylene and a fluororesin. Further, metal oxide films having fine pores or resin films composite with a metal oxide can be also used. Especially, metal oxide films having a multilayered structure are hardly penetrated by dendrite and therefore advantageous for preventing short circuits. Use of a fluororesin film that is a flame-retardant material, glass or a metal oxide film that is a noncombustible material will enhance safety.

Although a predetermined electrolyte may be used as-is regarding the above-mentioned electrolyte, it may be dissolved in a solvent and used as an electrolytic solution. Alternatively, a predetermined electrolytic solution may be solidified and used, by adding a gelling agent such as a polymer.

Generally, an electrolytic solution that has been formed by dissolving a predetermined electrolyte in a solvent is used and held within a porous separator. The conductivity of an electrolyte used needs to be preferably $1 \times 10^{-3}$ S/cm or more, more preferably $5 \times 10^{-3}$ S/cm or more at 25° C.

Examples of the above-mentioned electrolytes include salts that consist of lithium ion ($Li^+$) and a Lewis acid ion ($BF_4^-$, $PF_6^-$, $AsF_6^-$, $ClO_4^-$, $CF_3SO_3^-$, $BPh_4^-$ (Ph: phenyl group)), and mixed salts thereof. Further, salts that consist of a cation such as sodium ion, potassium ion, and tetraalkylammonium ion and a Lewis acid ion can also be used. It is preferable that these salts have preliminarily been subjected to a treatment such as heating under a reduced pressure or the like to perform sufficient dehydration and deoxidation.

Examples of the solvent of the above-mentioned electrolyte include acetonitrile, benzonitrile, propylene carbonate, ethylene carbonate, dimethyl carbonate, diethyl carbonate, dimethylformamide, tetrahydrofuran, nitrobenzene, dichloroethane, diethoxyethane, 1,2-dimethoxyethane, chlorobenzene, γ-butyrolactone, dioxolane, sulfolane, nitromethane, dimethylsulfide, dimethylsulfoxide, methyl formate, 3-methyl-2-oxazolidinone, 2-methyltetrahydrofuran, 3-propylsydnone, sulfur dioxide, phosphoryl chloride, thionyl chloride, sulfuryl chloride, or a mixed solution thereof can be used.

These solvents may preferably be dehydrated using, for example, activated alumina, molecular sieve, phosphorus pentoxide, calcium chloride, etc., and some solvents may be desirably further subjected to distillation in the presence of an alkaline metal in an inert gas for removing impurities and dehydration. It is preferable that these solvents are gelled in order to prevent leaking of the electrolytic solution. As a gelling agent, it is preferable to use those polymers that absorb the solvent of the electrolytic solution to swell. Examples of such polymers include polyethylene oxide, polyvinyl alcohol, polyvinylidene fluoride polyacrylonitrile copolymer, etc.

(Shape and Structure of Battery)

Examples of the shapes of the lithium secondary battery of the present invention include, for example, a flat type, a cylindrical type, a rectangular parallelepiped type, a sheet type, etc. Examples of the structure of the lithium secondary battery of the present invention include, for example, a monolayer type, a multilayer type, a spiral type, etc. Of the above-mentioned, a spiral type cylindrical battery has the advantages that an enlarged electrode area can be secured by interposition of a separator between negative and positive electrodes followed by rolling up, and thus a large current can be passed at the time of charging/discharging. Batteries of rectangular parallelepiped type and sheet type have the advantage that they can effectively make use of storage spaces in an apparatus which accommodates and is constituted of a plurality of batteries.

Figure 7:
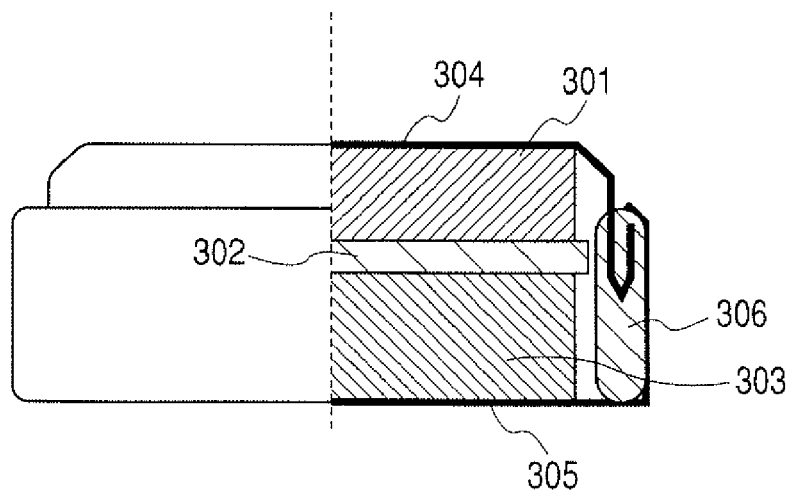
FIG. 7 is a partially sectional view schematically showing the constitution of an example of a single layer, flat type (coin type) lithium secondary battery in accordance with the present invention.
Figure 8:
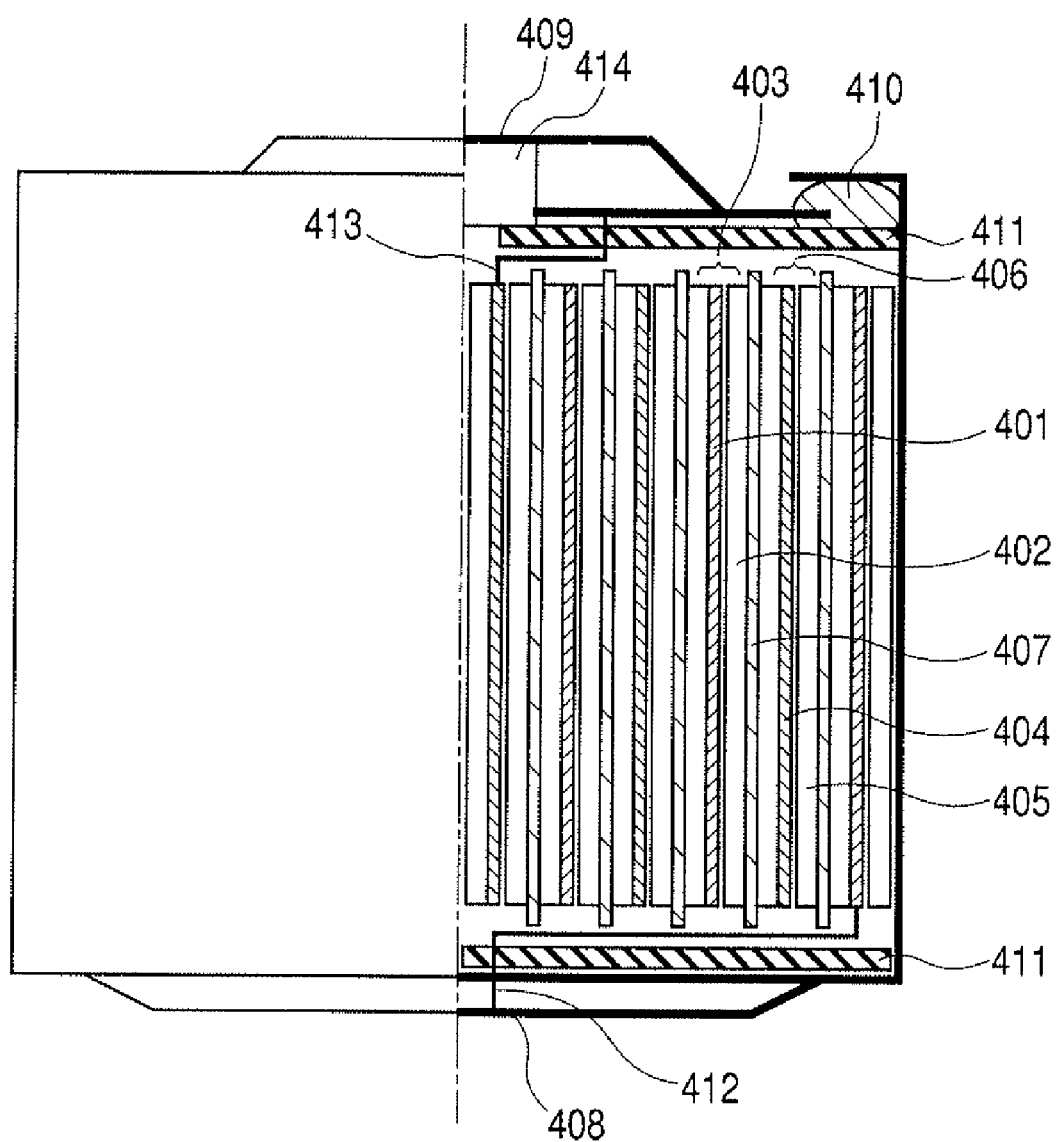
FIG. 8 is a partially sectional view schematically showing the constitution of an example of a spiral type cylindrical lithium secondary battery in accordance with the present invention.

Now, with reference to FIGS. 7 and 8, the shapes and structures of the lithium secondary battery of the present invention will be described in detail. FIG. 7 is a sectional view schematically showing the internal structure of a monolayer flat type (coin type) lithium secondary battery, and FIG. 8 is a sectional view schematically showing the internal structure of a spiral type cylindrical lithium secondary battery. These lithium secondary batteries have fundamentally the same constitution as the lithium secondary battery shown in FIG. 6, and have a negative electrode, a positive electrode, an electrolyte and a separator (i.e., ionic conductor), a battery housing, and output terminals.

In FIGS. 7 and 8, reference numerals 301 and 403 each denote a negative electrode; 303 and 406 each denote a positive electrode; 304 and 408 each denote a negative electrode terminal (negative electrode cap or negative electrode can); 305 and 409 each denote a positive electrode terminal (positive electrode can or positive electrode cap); 302 and 407 each denote separator/electrolytic solution; 306 and 410 each denote a gasket; 401 denotes a negative electrode collector; 404 denotes a positive electrode collector; 411 denotes an insulating plate; 412 denotes a negative electrode lead; 413 denotes a positive electrode lead; and 414 denotes a safety valve, respectively.

In the flat type (coin type) lithium secondary battery shown in FIG. 7, the positive electrode 303 with a positive electrode material layer, and the negative electrode 301 with a negative electrode material layer are stacked with at least a separator 302 holding an electrolytic solution therebetween. The stack is housed in the positive electrode can 305 as a positive electrode terminal from the positive electrode side, and the negative electrode side is covered with a negative electrode cap 304 which functions as a negative electrode terminal. The gasket 306 is arranged at other portions in the positive electrode can 305.

In the spiral cylindrical type lithium secondary battery shown in FIG. 8, the positive electrode 406 with a positive electrode active material layer 405 formed on the positive electrode collector 404, and negative electrode 403 with a negative electrode active material layer 402 formed on the negative electrode collector 401 face each other with at least a separator 407 (ionic conductor) holding an electrolytic solution therebetween and form a stack of a cylinder-like structure as rolled up multiple times. This rolled up, cylindrical structure stack is housed in a negative electrode can 408 as a negative electrode terminal. A positive electrode cap 409 as a positive electrode terminal is formed on the opening side of the negative electrode can 408, and the gasket 410 is arranged at other portions in the negative electrode can 408. Moreover, the cylindrical structure stack is isolated from the positive electrode cap side with the insulating plate 411. The positive electrode 406 is connected to the positive electrode cap 409 via a positive electrode lead 413. The negative electrode 403 is connected to the negative electrode can 408 via a negative electrode lead 412. A safety valve 414 for adjusting the pressure inside the battery is provided on the positive electrode cap side.

A typical assembling process of the lithium secondary batteries shown in FIGS. 7 and 8 will be described below.

(1) A negative electrode (301, 403) and a positive electrode (303, 406) are incorporated in a positive electrode can (305) or negative electrode can (408) with a separator (302, 407) therebetween.

(2) After an electrolyte is injected, a negative electrode cap (304) or a positive electrode cap (409) and a gasket (410, 306) are assembled.

(3) The assembly obtained in (2) above is caulked with an insulative packing to complete a battery.

The preparation of the materials for the lithium battery and the assembly of the battery are preferably carried out in a dry air or a dry inert gas from which moisture has been sufficiently removed.

The components that constitute the lithium secondary battery mentioned above will be described below.

(Insulative Packing)

As a material of the gasket (306, 410), a fluororesin, polyamide resin, polysulfone resin, and various kinds of rubbers can be used, for example. As a sealing method of the battery, methods utilizing glass sealing, adhesives, welding, or soldering can be employed in addition to the "caulking" with an insulative packing mentioned above. Various organic resin material and ceramics can be used as a material of the insulated plate 411 of FIG. 8.

(Outer Can)

The outer can of the battery consists of a positive electrode can or negative electrode can (305, 409) and a negative electrode cap or positive electrode cap (304, 408). As a constituent material of the outer can, stainless steel is preferably used. Especially, a titanium clad stainless steel, a copper clad stainless steel, a nickel-plated steel, and the like can be widely used.

Since the positive electrode can (305) in FIG. 7 and the negative electrode can (408) in FIG. 8 serve as a battery housing (case), stainless steel is preferably used as mentioned above. However, when the positive electrode can or negative electrode can does not serve as a battery housing, the material of the battery case may include metals such as zinc, plastics such as polypropylene and a composite material of metal or glass fiber with a plastic.

(Safety Valve)

The lithium secondary battery is equipped with a safety valve as safety measures in case of pressure increase inside the battery. Although not illustrated in FIG. 7, as a safety valve, rubber, a spring, a metal ball, a rupture disk, etc. can be used, for example.

EXAMPLES

The present invention will be described in detail by way of the examples shown below. These examples are only illustrative and the present invention is not limited to these examples. The "part" and "%" used in the following descriptions mean a "part by weight" and "% by weight (wt. %)", respectively unless mentioned particularly to the contrary.

Example 1

In this example, a lithium secondary battery with a cross-sectional structure shown in FIG. 7 was manufactured. Lithium metal was used for the negative electrode active material and lithium metal composite oxide particles prepared by the following method of the present invention was used for the positive electrode active material. With reference to FIG. 7, the manufacturing procedures of each component of the battery and the assembly of the battery are described below.

1. Preparation of Positive Electrode 303:

(1) Particles of $Li_{1.05}CoO_2$ that are lithium metal composite oxide particles of the present invention were prepared. First, 10 weight parts of cobalt nitrate hexahydrate and 10 weight parts of urea were dissolved in 300 weight parts of ion-exchanged water and while warming the mixture at 60° C., 33 weight parts of a nonionic surfactant (EMULGEN 210P, product of Kao Corp.) was added under agitation and then agitated with a stirrer for one hour. This mixture was placed in an oven set at 100° C. and allowed to stand still and kept warmed for 8 hours. The resulting precipitation was subjected to centrifugation with a hot ion-exchanged water and decantation each repeated several times, washed and dried at 70° C. for 8 hours. Thus, a dry powder of the deposited cobalt-containing compound was obtained. Next, lithium nitrate was weighed such that the ratio of the number of Li atoms to the number of Co atoms in this dry powder was Co:Li=1:1.07. After dissolving the weighed lithium nitrate in ion-exchanged water of a weight that was 50 times the weight of this lithium nitrate, the above-mentioned dry powder was dispersed in this solution, and agitated for 1 hour. After drying this liquid by a rotary evaporator and heat-treating in oxygen at 450° C. for 3 hours, calcining in oxygen at 850° C. for 6 hours were conducted to obtain lithium metal composite oxide particles.

The obtained lithium metal composite oxide particles was analyzed by inductively-coupled plasma emission spectrometer and the ratio of the numbers of Co atom to Li atom turned out to be Co:Li=1:1.05. Qualitative analysis carried out with X-ray diffractometer gave peaks attributable to crystal system, space group R3m. Subsequently, observation by a scanning electron microscope (SEM) revealed the following facts. That is, these lithium metal composite oxide particles contain both of columnar secondary particles and planar secondary particles, the particle sizes in the long length direction of the secondary particles are 8 to 12 μm, the sizes of the columnar secondary particles in the short length direction are 2 to 3 μm, and the thicknesses of the planar secondary particles are 0.1 to 0.3 μm. Further, the columnar secondary particles and planar secondary particles are formed of a plurality of primary particles of the size of 0.2 to 0.7 μm that aggregate with voids formed between particles. The specific surface area of the lithium metal composite oxide particles, determined with a specific surface area meter by means of gas adsorption according to the BET method, was 1.36 $m^2/g$.

(2) After mixing 5 parts of natural graphite powder and 5 parts of polyvinylidene fluoride powder with 90 parts of the lithium metal composite oxide particles obtained in (1) above, 100 parts of N-metal-2-pyrrolidone was added thereto to prepare a paste. After applying the resulting paste to an aluminum foil as a collector with a thickness of 0.03 mm and effecting drying, the paste was dried at 150° C. under reduced pressure. The thickness of the obtained article was adjusted with a roll-press machine and punched out in a circular shape to obtain a positive electrode 303.

2. Preparation of Negative Electrode 301:

For the purpose of evaluating the performance of only the positive electrode 303, metal lithium was used for a negative electrode 301. After bonding a metal lithium foil with a thickness of 0.2 mm to a nickel foil with a thickness of 0.1 mm in an argon atmosphere, the laminate was punched out in a circular shape to produce the negative electrode 301.

3. Preparation of Electrolytic Solution:

Ethylene carbonate (EC) and dimethyl carbonate (DMC) from which water was fully removed were mixed in equivalent amounts to prepare a solvent, and lithium tetrafluoroborate salt was dissolved in a concentration of 1M (mol/l) in the obtained solvent to obtain an electrolytic solution. A film of polyethylene with fine pores was prepared as a separator. The above-mentioned electrolytic solution is injected in the battery assembly step described below to be held within the above-mentioned separator, and the separator holding the electrolytic solution functions as an ionic conductor 302.

4. Assembly of Battery:

The separator prepared in 3 above was interposed between the positive electrode 303 prepared in 1 above and the negative electrode 301 prepared in 2 above, and this stack was inserted in a positive electrode can 305 formed of a titanium-clad stainless steel. Subsequently, the electrolytic solution prepared in 3 above was injected into the stack in the positive electrode can 305. Then, after putting an insulative packing 306 made of polypropylene and a negative electrode cap 304 formed of a titanium-clad stainless steel on the positive electrode can 305 and subjected to caulking, the lithium secondary battery of the structure shown in FIG. 7 was obtained. All the assembling procedures were carried out in a dry argon gas atmosphere.

(Evaluation of Battery Performance)

The obtained lithium secondary battery was evaluated for battery performance. The evaluation of the battery performance was performed by way of a charge/discharge cycle test in which charge/discharge cycle was repeated 30 times. The charge/discharge cycle test was performed under the following conditions. One cycle was started with charging and consisted of charging-resting (20 minutes)-discharging-resting (20 minutes), and the 1st to 10th cycles of charging/discharging were performed with a constant current at a current density of 30 mA per 1 g of the positive electrode active material, and then the 11th to 30th cycles of charging/discharging are performed with a constant current at a current density of 150 mA per 1 g of the positive electrode active material. The terminating voltage of charging was set to 4.35V, and the terminating voltage of discharging was set to 2.90V. Through this charge/discharge cycle test evaluated were (i) discharging capacity (discharging capacity per unit weight of positive electrode active material) at the 10th cycle, (ii) discharging capacity (discharging capacity per unit weight of positive electrode active material) at the 11th cycle, (iii) discharging capacity (discharging capacity per unit weight of positive electrode active material) at the 30th cycle, (iv) high-rate discharge characteristic, and (v) capacity holding characteristic. The high-rate discharge characteristic (iv) was determined using the discharging capacity at the 11th cycle and the discharging capacity at the 10th cycle obtained at the different current densities and evaluated in terms of the ratio of the discharging capacity at the 11th cycle to the discharging capacity at the 10th cycle. The capacity holding characteristic (v) was calculated by taking the ratio of the discharging capacity at the 30th cycle to the discharging capacity at the 11th cycle.

The obtained evaluation results are summarized in Table 1.

Comparative Example 1

In this comparative example, a lithium secondary battery of a structure shown in FIG. 7 was made following the same procedure as in Example 1 with the exception that the positive electrode active material (lithium metal composite oxide particles) was prepared according to the following different process. The obtained lithium secondary battery was evaluated for the battery performance as in Example 1. The obtained evaluation results are summarized in Table 1.

(Preparation of Lithium Metal Composite Oxide Particles)

In this comparative example, particles of $Li_{1.05}CoO_2$ as the lithium metal composite oxide particles were prepared as follows. First, in order to obtain the lithium metal composite oxide particles having the same elemental composition as in Example 1, 20 weight parts of tricobalt tetraoxide was weighed, and lithium carbonate was weighed such that the ratio of the number of Li atoms to the number of Co atoms contained therein was Co:Li=1:1.07. The weighed tricobalt tetraoxide and lithium carbonate were mixed and agitated with a planetary-type ball mill for 1 hour. After pre-calcining the obtained mixture for 5 hours at 800° C. in oxygen, the mixture was ground with a planetary-type ball mill for 1 hour. The mixture was further calcined at 850° C. in oxygen for 15 hours. The thus obtained lithium metal composite oxide was ground with a mortar and then subjected to 500-mesh screening to remove large particles. The thus obtained lithium metal composite oxide particle was qualitatively analyzed by an inductively-coupled plasma emission spectrometer and an X-ray diffractometer, it was confirmed that it is the lithium metal composite oxide particle of the same elemental composition as in Example 1. However, observation by a scanning electron microscope (SEM) revealed the following facts. That is, these lithium metal composite oxide particles do not contain any particle that can be referred to as a secondary particle and consist of a plurality of primary particles of the size of 2 to 10 μm in a randomly aggregated state. The specific surface area of the lithium metal composite oxide particles, determined with a specific surface area meter by means of gas adsorption according to the BET method, was 0.48 m²/g.

Example 2

In this example, a lithium secondary battery of a structure shown in FIG. 7 was made following the same procedure as in Example 1 with the exception that the positive electrode active material (lithium metal composite oxide particles) was prepared according to the following different process. The obtained lithium secondary battery was evaluated for the battery performance as in Example 1. The obtained evaluation results are summarized in Table 1.

(Preparation of Lithium Metal Composite Oxide Particles)

Particles of $Li_{1.05}Co_{0.9}Fe_{0.1}O_2$ that are lithium metal composite oxide particles of the present invention were prepared as follows. First, 10 weight parts of cobalt nitrate hexahydrate and 10 weight parts of urea were dissolved in 300 weight parts of ion-exchanged water and while warming the mixture at 60° C., 33 weight parts of a nonionic surfactant (EMULGEN 210P, product of Kao Corp.) was added under agitation and agitated with a stirrer for one hour. This mixture was placed in an oven set at 100° C. and allowed to stand still and kept warmed for 8 hours. The resulting precipitation was subjected to centrifugation and decantation using hot ion-exchanged water each repeated several times, washed and dried at 70° C. for 8 hours. Thus, a dry powder of the deposited cobalt-containing compound was obtained. Next, lithium nitrate and ferric nitrate nonahydrate were weighed such that the ratio of the numbers of Li atoms and Fe atoms to the number of Co atoms in this dry powder was Co:Li:Fe=0.9:1.07:0.1. After dissolving the weighed lithium nitrate and ferric nitrate non-ahydrate in ion-exchanged water of a weight that was 50 times the weight of this lithium nitrate, the above-mentioned dry powder was dispersed in this solution, and the solution was agitated for 1 hour. After drying of this liquid by a rotary evaporator followed by heat-treating in oxygen at 450° C. for 3 hours, calcining in oxygen at 850° C. for 6 hours were conducted to obtain lithium metal composite oxide particles.

The thus obtained lithium metal composite oxide particle was qualitatively analyzed by an inductively-coupled plasma emission spectrometer and an X-ray diffractometer, it was confirmed that it had an elemental composition of $Li_{1.05}Co_{0.9}Fe_{0.1}O_2$ and belonged to the same crystal system space group as in Example 1. Subsequently, observation by a scanning electron microscope (SEM) revealed the following facts. That is, these lithium metal composite oxide particles contain both of columnar secondary particles and planar secondary particles, the particle sizes in the long length direction of these secondary particles are 5 to 9 μm, the sizes of the columnar secondary particles in the short length direction are 1 to 2 μm, and the thicknesses of the planar secondary particles are 0.1 to 0.2 μm. Further, these columnar secondary particles and planar secondary particles are formed of a plurality of primary particles of the size of 0.2 to 0.5 μm that aggregate with voids formed therebetween. The specific surface area of the lithium metal composite oxide particles, determined with a specific surface area meter by means of gas adsorption according to the BET method, was 2.03 m$^2$/g.

Comparative Example 2

In this comparative example, a lithium secondary battery of a structure shown in FIG. 7 was made following the same procedure as in Example 2 with the exception that the positive electrode active material (lithium metal composite oxide particles) was prepared according to the following different process. The obtained lithium secondary battery was evaluated for the battery performance as in Example 1. The obtained evaluation results are summarized in Table 1.
(Preparation of Lithium Metal Composite Oxide Particles)

In this comparative example, particles of $Li_{1.05}Co_{0.9}Fe_{0.1}O_2$ as the lithium metal composite oxide particles were prepared as follows. First, in order to obtain lithium metal composite oxide particles having the same elemental composition as in Example 2, 20 weight parts of tricobalt tetraoxide was weighed, and lithium carbonate and ferric oxide were weighed such that the ratio of the numbers of Li atoms and Fe atoms to the number of Co atoms contained therein was Co:Li:Fe=0.9:1.07:0.1. The weighed tricobalt tetraoxide, lithium carbonate and ferric oxide were mixed and agitated in a planetary-type ball mill for 1 hour. After pre-calcining the obtained mixture for 5 hours at 800° C. in oxygen, the mixture was ground by a planetary-type ball mill for 1 hour. The mixture was further calcined at 850° C. in oxygen for 15 hours. The obtained lithium metal composite oxide was ground with a mortar and subjected to 500-mesh screening to remove large particles. The thus obtained lithium metal composite oxide particle was qualitatively analyzed by an inductively-coupled plasma emission spectrometer and an X-ray diffractometer, it was confirmed that it was lithium metal composite oxide particle of the same elemental composition and belonging to the same crystal system space group as in Example 2. However, observation by a scanning electron microscope (SEM) revealed the following facts. That is, these lithium metal composite oxide particles do not contain any particle that can be referred to as a secondary particle and consist of a plurality of primary particles of the size of 0.5 to 3 μm in a randomly aggregated state. The specific surface area of the lithium metal composite oxide particles, determined with a specific surface area meter by means of gas adsorption according to the BET method, was 0.56 m$^2$/g.

Example 3

In this example, a lithium secondary battery of a structure shown in FIG. 7 was made following the same procedure as in Example 1 with the exception that the positive electrode active material (lithium metal composite oxide particles) was prepared according to the following different process. The obtained lithium secondary battery was evaluated for the battery performance as in Example 1. The obtained evaluation results are summarized in Table 1.
(Preparation of Lithium Metal Composite Oxide Particles)

Particles of $Li_{1.05}Co_{0.8}Mn_{0.2}O_2$ that are lithium metal composite oxide particles of the present invention were prepared as follows. First, 10 weight parts of cobalt nitrate hexahydrate and 10 weight parts of urea were dissolved in 300 weight parts of ion-exchanged water and while warming the mixture at 60° C., 33 weight parts of a nonionic surfactant (EMULGEN 210P, product of Kao Corp.) was added under agitation and agitated with a stirrer for one hour. This mixture was placed in an oven set at 100° C. and allowed to stand still and kept warmed for 8 hours. The resulting precipitation was subjected to centrifugation and decantation with hot ion-exchanged water each repeated several times, washed and dried at 70° C. for 8 hours. Thus, a dry powder of the deposited cobalt-containing compound was obtained. Next, lithium nitrate and manganese nitrate hexahydrate were weighed such that the ratio of the numbers of Li atoms and Mn atoms to the number of Co atoms in this dry powder was Co:Li:Mn=0.8:1.07:0.2. After dissolving the weighed lithium nitrate and manganese nitrate hexahydrate in ion-exchanged water of a weight that was 50 times the weight of this lithium nitrate, the above-mentioned dry powder was dispersed in this solution, and agitated for 1 hour. After drying of this liquid with a rotary evaporator followed by heat-treating in oxygen at 450° C. for 3 hours, calcining in oxygen at 850° C. for 6 hours were conducted to obtain lithium metal composite oxide particles.

The thus obtained lithium metal composite oxide particle was qualitatively analyzed by an inductively-coupled plasma emission spectrometer and an X-ray diffractometer, it was confirmed that it had an elemental composition of $Li_{1.05}Co_{0.8}Mn_{0.2}O_2$ and belonged to the same crystal system space group as in Example 1. Subsequently, observation by a scanning electron microscope (SEM) revealed the following facts. That is, these lithium metal composite oxide particle contains both of columnar secondary particles and planar secondary particles, the particle sizes in the long length direction of these secondary particles are 6 to 13 μm, the sizes of the columnar secondary particles in the short length direction are 2 to 3 μm, and the thicknesses of the planar secondary particles are 0.1 to 0.2 μm. Further, these columnar secondary particles and planar secondary particles are formed of a plurality of primary particles of the size of 0.2 to 0.5 μm that aggregate with voids formed therebetween. The specific surface area of the lithium metal composite oxide particles, determined with a specific surface area meter by means of gas adsorption according to the BET method, was 2.15 m$^2$/g.

Comparative Example 3

In this comparative example, a lithium secondary battery of a structure shown in FIG. 7 was made following the same procedure as in Example 3 with the exception that the positive electrode active material (lithium metal composite oxide particles) was prepared according to the following different process. The obtained lithium secondary battery was evaluated for the battery performance as in Example 1. The obtained evaluation results are summarized in Table 1.
(Preparation of Lithium Metal Composite Oxide Particles)

In this comparative example, particles of $Li_{1.05}Co_{0.8}Mn_{0.2}O_2$ as the lithium metal composite oxide particles were prepared as follows. First, in order to obtain the lithium metal composite oxide particles having the same elemental composition as in Example 3, 20 weight parts of tricobalt tetraoxide was weighed, and lithium cabonate and trimanganese tetraoxide were weighed such that the ratio of the numbers of Li atoms and Mn atoms to the number of Co atoms contained therein was Co:Li:Mn=0.8:1.07:0.2. The weighed tricobalt tetraoxide, lithium carbonate and trimanganese tetraoxide were mixed and agitated in a planetary-type ball mill for 1 hour. After pre-calcining the obtained mixture for 5 hours at 800° C. in oxygen, the mixture was ground by a planetary-type ball mill for 1 hour. Further, the mixture was calcined at 850° C. in oxygen for 15 hours. The obtained lithium metal composite oxide was ground with a mortar and subjected to 500-mesh screening to remove large particles. The thus obtained lithium metal composite oxide particle was qualitatively analyzed by an inductively-coupled plasma emission spectrometer and an X-ray diffractometer, it was confirmed that it was lithium metal composite oxide particle of the same elemental composition and belonging to the same crystal system space group as in Example 3. However, observation by a scanning electron microscope (SEM) revealed the following facts. That is, these lithium metal composite oxide particles do not contain any particle that can be referred to as a secondary particle and consist of a plurality of primary particles of the size of 0.3 to 1.5 μm in a randomly aggregated state. The specific surface area of the lithium metal composite oxide particles, determined with a specific surface area meter by means of gas adsorption according to the BET method, was 0.61 m$^2$/g.

Example 4

In this example, a lithium secondary battery of a structure shown in FIG. 7 was made following the procedure as in Example 1 with the exception that the positive electrode active material (lithium metal composite oxide particles) was prepared according to the following different process. The obtained lithium secondary battery was evaluated for the battery performance as in Example 1. The obtained evaluation results are summarized in Table 1.
(Preparation of Lithium Metal Composite Oxide Particles)

Particles of $Li_{1.05}Co_{0.975}Ti_{0.025}O_2$ that are lithium metal composite oxide particles of the present invention were prepared as follows. First, 10 weight parts of cobalt nitrate hexahydrate and 10 weight parts of urea were dissolved in 300 weight parts of ion-exchanged water and while warming the mixture at 60° C., 33 weight parts of a nonionic surfactant (EMULGEN 210P, product of Kao Corp.) was added under agitation and agitated with a stirrer for one hour. This mixture was placed in an oven set at 100° C. and allowed to stand still and kept warmed for 8 hours. The resulting precipitation was subjected to centrifugation and decantation with hot ion-exchanged water each repeated several times, washed and dried at 70° C. for 8 hours. Thus, a dry powder of the deposited cobalt-containing compound was obtained. Next, lithium nitrate and a 6% aqueous dispersion of titanium dioxide were weighed such that the ratio of the numbers of Li atoms and Ti atoms to the number of Co atoms in this dry powder was Co:Li:Ti=0.975:1.07:0.025. After dissolving the weighed lithium nitrate and 6% aqueous dispersion of titanium dioxide in ion-exchanged water of a weight that was 50 times the weight of this lithium nitrate, the above-mentioned dry powder was dispersed in this liquid and agitated for 1 hour. After drying of this liquid by a rotary evaporator followed by heat-treating in oxygen at 450° C. for 3 hours, calcining in oxygen at 850° C. for 6 hours was conducted to obtain lithium metal composite oxide particles.

The thus obtained lithium metal composite oxide particle was qualitatively analyzed by an inductively-coupled plasma emission spectrometer and an X-ray diffractometer, it was confirmed that it had an elemental composition of $Li_{1.05}Co_{0.975}Ti_{0.025}O_2$ and belonged to the same crystal system space group as in Example 1. Subsequently, observation by a scanning electron microscope (SEM) revealed the following facts. That is, these lithium metal composite oxide particles contain both of columnar secondary particles and planar secondary particles, the particle sizes in the long length direction of these secondary particles are 5 to 11 μm, the sizes of the columnar secondary particles in the short length direction are 1 to 3 μm, and the thicknesses of the planar secondary particles are 0.1 to 0.2 μm. Further, these columnar secondary particles and planar secondary particles are formed of a plurality of primary particles of the size of 0.2 to 0.7 μm that aggregate with voids formed therebetween. The specific surface area of the lithium metal composite oxide particles, determined with a specific surface area meter by means of gas adsorption according to the BET method, was 2.38 m$^2$/g.

Comparative Example 4

In this comparative example, a lithium secondary battery of a structure shown in FIG. 7 was made following the same procedure as in Example 4 with the exception that the positive electrode active material (lithium metal composite oxide particles) was prepared according to the following different process. The obtained lithium secondary battery was evaluated for the battery performance similarly in Example 1. The obtained evaluation results are summarized in Table 1.
(Preparation of Lithium Metal Composite Oxide Particles)

In this comparative example, particles of $Li_{1.05}Co_{0.975}Ti_{0.025}O_2$ as the lithium metal composite oxide particles were prepared as follows. First, in order to obtain the lithium metal composite oxide particles having the same elemental composition as in Example 4, 20 weight parts of tricobalt tetraoxide was weighed, and lithium carbonate and titanium dioxide (trade name: anatase) were weighed such that the ratio of the numbers of Li atoms and Ti atoms to the number of Co atoms contained therein was Co:Li:Ti=0.975:1.07:0.025. The weighed tricobalt tetraoxide, lithium carbonate and titanium dioxide were mixed and agitated in a planetary-type ball mill for 1 hour. After pre-calcining the obtained mixture for 5 hours at 800° C. in oxygen, the mixture was ground by a planetary-type ball mill for 1 hour. Further, the mixture was calcined at 850° C. in oxygen for 15 hours. The obtained lithium metal composite oxide was ground with a mortar and subjected to 500-mesh screening to remove large particles. The thus obtained lithium metal composite oxide particle was qualitatively analyzed by an inductively-coupled plasma emission spectrometer and an X-ray diffractometer, it was confirmed that it was lithium metal composite oxide particle of the same elemental composition and belonging to the same crystal system space group as in Example 4. However, observation by a scanning electron microscope (SEM) revealed the following facts. That is, these lithium metal composite oxide particles do not contain any particle that can be referred to as a secondary particle and consist of a plurality of primary particles of the size of 0.2 to 1.2 μm in a randomly aggregated state. The specific surface area of the lithium metal composite oxide particles, determined with a specific surface area meter by means of gas adsorption according to the BET method, was 0.83 m$^2$/g.

Example 5

In this example, a lithium secondary battery of a structure shown in FIG. 7 was made following the same procedure as in Example 1 with the exception that the positive electrode active material (lithium metal composite oxide particles) was prepared according to the following difference process. The obtained lithium secondary battery was evaluated for the battery performance as in Example 1. The obtained evaluation results are summarized in Table 1.

(Preparation of Lithium Metal Composite Oxide Particles)

Particles of $Li_{1.05}Co_{0.9}Ni_{0.1}O_2$ that are lithium metal composite oxide particles of the present invention were prepared as follows. First, 10 weight parts of cobalt nitrate hexahydrate and 10 weight parts of urea were dissolved in 300 weight parts of ion-exchanged water and while warming the mixture at 60° C., 33 weight parts of a nonionic surfactant (EMULGEN 210P, product of Kao Corp.) was added under agitation and agitated with a stirrer for one hour. This mixture was placed in an oven set at 100° C. and allowed to stand still and kept warmed for 8 hours. The resulting precipitation was subjected to centrifugation and decantation with hot ion-exchanged water each repeated several times, washed and dried at 70° C. for 8 hours. Thus, a dry powder of the deposited cobalt-containing compound was obtained. Next, lithium nitrate and nickel nitrate hexahydrate were weighed such that the ratio of the numbers of Li atoms and Ni atoms to the number of Co atoms in this dry powder was Co:Li:Ni=0.9:1.07:0.1. After dissolving the weighed lithium nitrate and nickel nitrate hexahydrate in ion-exchanged water of a weight that was 50 times the weight of this lithium nitrate, the above-mentioned dry powder was dispersed in this liquid and agitated for 1 hour. After drying of this liquid by a rotary evaporator followed by heat-treating in oxygen at 450° C. for 3 hours, calcining in oxygen at 850° C. for 6 hours was conducted to obtain lithium metal composite oxide particles.

The thus obtained lithium metal composite oxide particle was qualitatively analyzed by an inductively-coupled plasma emission spectrometer and an X-ray diffractometer, it was confirmed that it had an elemental composition of $Li_{1.05}Co_{0.9}Ni_{0.1}O_2$ and belonged to the same crystal system space group as in Example 1. Subsequently, observation by a scanning electron microscope (SEM) revealed the following facts. That is, these lithium metal composite oxide particles contain both of columnar secondary particles and planar secondary particles, the particle sizes in the long length direction of these secondary particles are 7 to 14 μm, the sizes of the columnar secondary particles in the short length direction are 2 to 4 and the thicknesses of the planar secondary particles are 0.1 to 0.3 μm. Further, these columnar secondary particles and planar secondary particles are formed of a plurality of primary particles of the size of 0.2 to 1 μm that aggregate with voids formed therebetween. The specific surface area of the lithium metal composite oxide particles, determined with a specific surface area meter by means of gas adsorption according to the BET method, was 1.52 m²/g.

Comparative Example 5

In this comparative example, a lithium secondary battery of a structure shown in FIG. 7 was made following the same procedure as in Example 5 with the exception that the positive electrode active material (lithium metal composite oxide particles) was prepared according to the following different process. The obtained lithium secondary battery was evaluated for the battery performance similarly in Example 1. The obtained evaluation results are summarized in Table 1.

(Preparation of Lithium Metal Composite Oxide Particles)

In this comparative example, particles of $Li_{1.05}Co_{0.9}Ni_{0.1}O_2$ as the lithium metal composite oxide particles were prepared as follows. First, in order to obtain the lithium metal composite oxide particles having the same elemental composition as in Example 5, 20 weight parts of tricobalt tetraoxide was weighed, and lithium carbonate and nickel hydroxide were weighed such that the ratio of the numbers of Li atoms and Ni atoms to the number of Co atoms contained therein was Co:Li:Ni=0.9:1.07:0.1. The weighed tricobalt tetraoxide, lithium carbonate and nickel hydroxide were mixed and agitated in a planetary-type ball mill for 1 hour. After pre-calcining the obtained mixture for 5 hours at 800° C. in oxygen, the mixture was ground by a planetary-type ball mill for 1 hour. Further, the mixture was calcined at 850° C. in oxygen for 15 hours. The obtained lithium metal composite oxide was ground with a mortar and subjected to 500-mesh screening to remove large particles. The thus obtained lithium metal composite oxide particle was qualitatively analyzed by an inductively-coupled plasma emission spectrometer and an X-ray diffractometer, it was confirmed that it was lithium metal composite oxide particle of the same elemental composition and belonging to the same crystal system space group as in Example 5. However, observation by a scanning electron microscope (SEM) revealed the following facts. That is, these lithium metal composite oxide particles do not contain any particle that can be referred to as a secondary particle and consist of a plurality of primary particles of the size of 2 to 5 μm in a randomly aggregated state. The specific surface area of the lithium metal composite oxide particles, determined with a specific surface area meter by means of gas adsorption according to the BET method, was 0.51 m²/g.

As stated above, Table 1 summarizes the results of the lithium secondary batteries made in Examples 1 to 5 and Comparative Examples 1 to 5 evaluated through the charge/discharge cycle test with regard to (i) discharging capacity (discharging capacity per unit weight of positive electrode active material weight) at the 10th cycle, (ii) discharging capacity (discharging capacity per unit weight of positive electrode active material weight) at the 11th cycle, (iii) discharging capacity (discharging capacity per unit weight of positive electrode active material weight) at the 30th cycle, (iv) high-rate discharge characteristic, and (v) capacity holding characteristic. The values shown in Table 1 are relative values obtained by comparing the value of each Example with the value of the corresponding Comparative Example. That is, for example, the value of 1.03 at "Discharging Capacity at 10th Cycle" in the row of "Example 1/Comparative Example 1" is a relative value, where the value of the evaluation criteria (i) of Comparative Example 1 is set as 1 and the value of the evaluation criteria (i) of Example 1 is indicated relatively to this.

TABLE 1

| Example/Comparative Example | Synthesized Active Material | B.E.T. Specific Surface Area Example/Comparative Example | Discharging Capacity at 10th Cycle Example/Comparative Example | Discharging Capacity at 11th Cycle Example/Comparative Example | Discharging Capacity at 30th Cycle Example/Comparative Example | High-Rate Discharge Characteristic (Note 1) Example/Comparative Example | Capacity Holding Rate (Note 2) Example/Comparative Example |
|---|---|---|---|---|---|---|---|
| Example 1/Comparative Example 1 | $Li_{1.05}CoO_2$ | 2.8 | 1.03 | 1.07 | 1.15 | 1.04 | 1.07 |
| Example 2/Comparative Example 2 | $Li_{1.05}Co_{0.9}Fe_{0.1}O_2$ | 3.6 | 1.03 | 1.12 | 1.17 | 1.09 | 1.04 |
| Example 3/Comparative Example 3 | $Li_{1.05}Co_{0.8}Mn_{0.2}O_2$ | 3.5 | 1.02 | 1.11 | 1.15 | 1.09 | 1.03 |
| Example 4/Comparative Example 4 | $Li_{1.05}Co_{0.975}Ti_{0.02}O_2$ | 2.9 | 1.02 | 1.10 | 1.16 | 1.08 | 1.05 |
| Example 5/Comparative Example 5 | $Li_{1.05}Co_{0.9}Ni_{0.1}O_2$ | 3.0 | 1.03 | 1.09 | 1.18 | 1.07 | 1.08 |

(Note 1)
High-Rate Discharge Characteristic = Discharging Capacity at 11th Cycle/Discharging Capacity at 10th Cycle
(Note 2)
Capacity Holding Rate = Discharging Capacity at 30th Cycle/Discharging Capacity at 11th Cycle It is appreciated that the lithium secondary batteries of Examples 1 to 5 which are examples within the scope of the present invention are clearly superior to the lithium secondary batteries of Comparative Examples 1 to 5 which are examples out of the scope of the present invention in the discharging capacity, the high-rate discharge characteristic and the charge/discharge cycle characteristic as shown by the results in Table 1.

As is seen from the above, the present invention using "lithium metal composite oxide particles that electrochemically intercalate and deintercalate lithium ions, characterized by comprising a plurality of secondary particles in an elongated shape formed of a plurality of primary particles whose average particle size is 0.1 to 1 µm, wherein the primary particles aggregate to form voids therebetween and the secondary particle is in a columnar or planar shape having an average size in the long length direction of 5 to 15 µm" as a positive electrode active material of the lithium secondary battery provides a lithium secondary battery having a high capacity, and excellent high-rate discharge characteristic and charge/discharge cycle characteristic.

What is claimed is:

1. An electrode structure for a lithium secondary battery using intercalation and deintercalation reactions of lithium ions, which comprises, as a main component material, lithium metal composite oxide particles which electrochemically intercalate and deintercalate lithium ions, the lithium metal composite oxide particles comprising a plurality of secondary particles in an elongated shape each comprised of a plurality of primary particles with an average particle size of 0.1 µm to 1µm so aggregated as to form voids therebetween,
    wherein the sizes of the plurality of secondary particles in a long length direction are 5 µm to 14 µm,
    wherein the plurality of secondary particles comprises columnar secondary particles and planar secondary particles,
    wherein the sizes of the columnar secondary particles in a short length direction are 1 µm to 4 µm, and the thicknesses of the planar secondary particles are 0.1 µm to 0.3 µm, and
    wherein the lithium metal composite oxide particles have an elemental composition represented by the general formula: $Li_xCoO_2 (0<x\leq1.2)$ or $Li_xCo_{1-y}M_yO_2$ $(0<x\leq1.2, 0<y\leq0.2)$, where M is an element selected from the group consisting of Ni, Mn, Ti, Fe, Al, Si, Y, Zr, Nb, and Mo.

2. A lithium secondary battery comprising a negative electrode, a positive electrode, an electrolyte and a battery case, and using intercalation and deintercalation reactions of lithium ions for charging/discharging, wherein the positive electrode comprises the electrode structure set forth in claim 1.

* * * * *